Jan. 15, 1929.

B. F. STEIGER ET AL 1,699,455

PROTECTIVE MEANS FOR CURRENT RECTIFYING SYSTEMS

Filed Dec. 14, 1927

INVENTORS:
Benjamin F. Steiger,
Walter A. Leffner,
Francis A. Holt,
By Byrnes, Townsend & Brickenstein
ATTORNEYS.

Patented Jan. 15, 1929.

1,699,455

UNITED STATES PATENT OFFICE.

BENJAMIN F. STEIGER, OF NEWARK, AND WALTER A. HEPPNER, OF RED BANK, NEW JERSEY, AND FRANCIS A. HOLT, OF NEW YORK, N. Y., ASSIGNORS TO NATIONAL CARBON COMPANY, INC., A CORPORATION OF NEW YORK.

PROTECTIVE MEANS FOR CURRENT-RECTIFYING SYSTEMS.

Application filed December 14, 1927. Serial No. 240,038.

The invention relates to systems for rectifying alternating current and supplying the more or less completely smoothed rectified current to a load.

In systems of the kind referred to a rectifier of any conventional type is used and a capacity is usually connected in parallel with the load across the output of the rectifier. Inductive reactance in one or more sections is ordinarily connected in series with the load for the sake of better smoothing. A transformer is generally employed to step the A. C. voltage up or down according to the requirements of the load. In another type of apparatus the capacity is replaced by a battery, the latter having a very effective smoothing action when floated across the output of the rectifier.

When a battery is used in the manner described above and the alternating current supply fails for any reason, the load being connected, the battery discharges through the load until exhausted. This throws the entire system out of adjustment. When the A. C. supply is restored and if the battery used is of the non-reversible type, for example a dry battery, the system is permanently damaged.

A principal object of the present invention is to prevent detrimental discharge of the battery in the event of failure of the A. C. supply. Other objects of the invention will be apparent from the following description.

Figure 1:
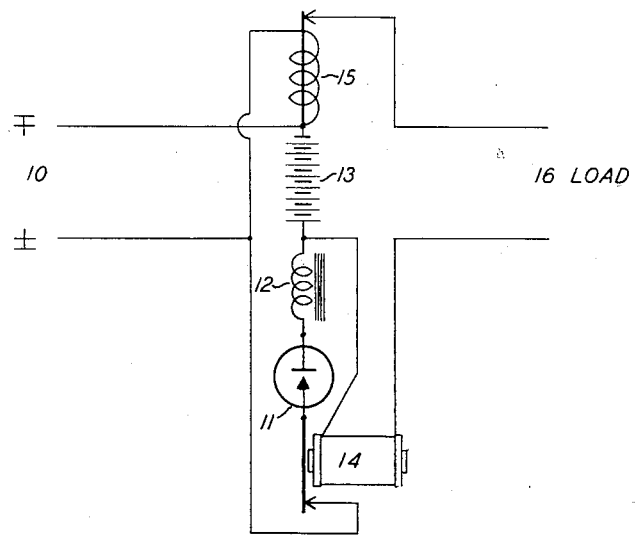
Figure 2:
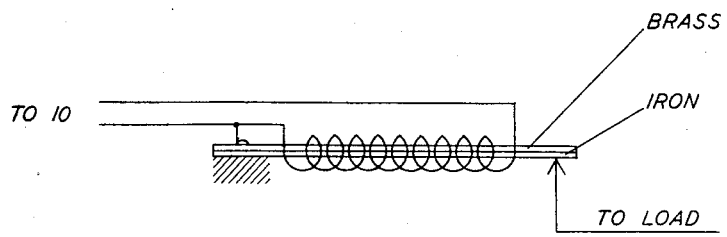

We obtain these objects by the apparatus shown in the accompanying drawing in which:

Fig. 1 is a schematic view of a current rectifying system embodying this invention; and Fig. 2 is a schematic view of the thermostatic relay shown in Fig. 1.

In the drawing—10 represents a portion of an A. C. circuit in series with which is connected a rectifier 11, of any suitable type, an inductive reactor or choke coil 12, and a battery 13, through the separable contacts of a relay 14 operable by the current in a load circuit 16 connected in parallel with the battery 13. Thus the source of current is disconnected from the rectifier and battery when the load circuit is open, thereby preventing the rectified current from overcharging or injuring the battery when the load is off and when all of the rectified current must pass through the battery.

The separable contacts of a thermal switch 15, operable by the alternating current, is connected in series with the load circuit 16. The thermal switch 15, diagrammatically illustrated in Fig. 2, has a flexible member composed of two different metals having different coefficients of expansion, such as brass and iron, so arranged that the member is flexed when heated and the load circuit 16 is thereby closed. An electric heater of conventional design connected to the source of alternating current serves to heat the flexible member when alternating current flows at 10 so that the load circuit may be closed only while the source of alternating current is energized thus preventing rapid exhaustion of the battery.

When the load circuit is closed the relay 14 connects the source of current to the rectifier 11 and the rectified current is fed to the battery 13 and the load 16 in parallel through the inductance 12. The rectified current and the load current may be of substantially the same value so the battery 13 floats across the output of the rectifier and serves principally to remove the ripple from the rectified current. When the source of alternating current fails the switch 15 opens the load circuit and prevents exhaustion of the battery 13. When the load circuit is opened the relay 14 disconnects the source of current from the rectifier and the battery so the battery remains disconnected from both the source of current and the load while the load circuit is open.

The system, of course, may comprise a transformer connected between the source of current and the rectifier 11, with the separable contacts of the relay 14 connected in series with the transformer primary. Also, a full wave rectifier of any suitable type may be substituted for the one shown. The battery may consist of one or more primary or secondary cells of any suitable type, dry cells being preferred because of their convenience.

The relay 14 forms no part of the invention and it may be replaced by manually operable switching means. Under some conditions, such as where the load circuit is always closed, the relay 14 becomes superfluous.

These and other variations, substitutions, and arrangements may be made without departing from the invention and we do not confine ourselves to the embodiment illustrated as it is but one application of the invention.

We claim:

1. A system for supplying smoothed rectified current comprising a source of alterating current, a rectifier, and a battery and load connected in parallel across the output of the rectifier, and means connected with the alternating current circuit and adapted to open the load circuit when said means is deenergized by failure of the alternating current.

2. A system for supplying smoothed rectified current comprising a source of alterating current, a rectifier, and a battery and load connected in parallel across the output of the rectifier, and a thermal switch connected with the alternating current circuit and adapted to open the load circuit when said thermal switch is deenergized by failure of the alternating current.

3. A system for supplying smoothed rectified current comprising a source of alternating current, a rectifier, and a battery and load connected in parallel across the output of the rectifier, and means comprising an expansible contact member and a heater therefor connected with the alternating current circuit and adapted to open the load circuit when said heater is deenergized by failure of the alternating current.

4. A system for supplying smoothed rectified current comprising a source of alternating current, a rectifier, and a battery and load connected in parallel across the output of the rectifier, and means comprising a bimetallic contact member and a heater therefor connected with the alternating current circuit and adapted to open the load circuit when said heater is deenergized by failure of the alternating current.

5. A system for supplying smoothed rectified current comprising a source of alternating current, a rectifier, and a battery of dry cells and load connected in parallel across the output of the rectifier, and means connected with the alternating current circuit and adapted to open the load circuit when said means is deenergized by failure of the alternating current.

In testimony whereof, we affix our signatures.

BENJAMIN F. STEIGER.
WALTER A. HEPPNER.
FRANCIS A. HOLT.